United States Patent
Hong et al.

(10) Patent No.: US 9,870,746 B2
(45) Date of Patent: Jan. 16, 2018

(54) LIQUID CRYSTAL DISPLAY APPARATUS

(71) Applicant: SAMSUNG DISPLAY CO., LTD., Yongin, Gyeonggi-Do (KR)

(72) Inventors: Seokha Hong, Yongin-si (KR); Se Hyoung Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 41 days.

(21) Appl. No.: 14/664,777

(22) Filed: Mar. 20, 2015

(65) Prior Publication Data

US 2015/0339985 A1 Nov. 26, 2015

(30) Foreign Application Priority Data

May 26, 2014 (KR) ........................ 10-2014-0063129

(51) Int. Cl.
| | |
|---|---|
| G09G 3/36 | (2006.01) |
| G02F 1/1333 | (2006.01) |
| G06F 3/041 | (2006.01) |
| G06F 3/042 | (2006.01) |

(52) U.S. Cl.
CPC ....... *G09G 3/3655* (2013.01); *G02F 1/13338* (2013.01); *G06F 3/042* (2013.01); *G06F 3/0412* (2013.01); *G02F 2201/58* (2013.01); *G09G 2300/0417* (2013.01); *G09G 2300/0465* (2013.01); *G09G 2320/0626* (2013.01); *G09G 2354/00* (2013.01); *G09G 2360/148* (2013.01)

(58) Field of Classification Search
CPC ... G09G 3/3648; G09G 3/0412; G06F 3/0488
See application file for complete search history.

(56) References Cited

U.S. PATENT DOCUMENTS

| | | | |
|---|---|---|---|
| 7,323,718 B2 | 1/2008 | Chen et al. | |
| 7,709,868 B2 | 5/2010 | Pak et al. | |
| 7,834,940 B2 * | 11/2010 | Uemoto | G01J 1/4228 |
| | | | 349/106 |
| 7,859,494 B2 * | 12/2010 | Choi | G09G 3/3233 |
| | | | 345/207 |
| 8,154,532 B2 | 4/2012 | Chou et al. | |
| 8,289,285 B2 | 10/2012 | Jang et al. | |
| 8,941,562 B2 * | 1/2015 | Hwang | G09G 3/36 |
| | | | 345/102 |

(Continued)

FOREIGN PATENT DOCUMENTS

| | | |
|---|---|---|
| KR | 10-2006-0132372 A | 12/2006 |
| KR | 10-2010-0006036 A | 1/2010 |
| KR | 10-1001960 B1 | 12/2010 |

OTHER PUBLICATIONS

Korean Patent Abstract for KR 10-2005-0065970 A, which corresponds to KR Publ. No. 10-1001960 B1, published Dec. 17, 2010, 1 page.

*Primary Examiner* — Ricardo L Osorio
(74) *Attorney, Agent, or Firm* — Lewis Roca Rothgerber Christie LLP

(57) ABSTRACT

A liquid crystal display apparatus is provided which includes a pixel including a storage capacitor, wherein the storage capacitor is connected to be between a pixel electrode and a storage voltage line, a light sensing unit connected to be between the storage voltage line and a first node, and a transfer unit connected to transfer a voltage from the first node to a sensing line.

4 Claims, 16 Drawing Sheets

(56) References Cited

U.S. PATENT DOCUMENTS

| | | | |
|---|---|---|---|
| 2006/0145365 A1* | 7/2006 | Halls | B82Y 10/00 |
| | | | 347/238 |
| 2008/0158120 A1 | 7/2008 | An et al. | |
| 2010/0053379 A1* | 3/2010 | Willassen | H04N 3/1568 |
| | | | 348/241 |
| 2011/0063243 A1 | 3/2011 | Kim et al. | |
| 2012/0126132 A1* | 5/2012 | Kimura | H04N 5/32 |
| | | | 250/370.09 |
| 2014/0267875 A1* | 9/2014 | Gruhlke | H04N 5/238 |
| | | | 348/335 |

* cited by examiner

LIQUID CRYSTAL DISPLAY APPARATUS

CROSS-REFERENCE TO RELATED APPLICATION

This application claims priority to and the benefit of Korean Patent Application No. 10-2014-0063129, filed on May 26, 2014, the content of which in its entirety is herein incorporated by reference.

BACKGROUND

Exemplary embodiments of the invention disclosed herein relate to a liquid crystal display (LCD) apparatus, and more particularly, to an LCD apparatus having a contact sensing function.

A liquid crystal display (LCD) apparatus is currently one of flat panel display apparatuses being most widely used and includes, two sheets of display plates on which field generating electrodes are formed such as a pixel electrode and a common electrode, and a liquid crystal layer in between. The LCD apparatus applies a voltage to the field generating electrode to generate an electric field for the liquid crystal layer, and this electric field determines the directions of liquid crystal molecules on the liquid crystal layer and controls the polarization of incident light to display an image.

A touch screen panel is a device that enables a user to execute an icon so that a machine such as a computer can perform a desired command or to write a text or draw a picture by contacting a finger or a touch pen/stylus with a screen.

An LCD apparatus including the touch screen panel may find out whether a user's finger or touch pen is in touch with the screen and information on a contact location. However, such an LCD apparatus has limitations in cost increase due to the touch screen panel, yield decrease due to an additional process of bonding the touch screen panel to a liquid crystal display plate, luminescence decrease of the liquid crystal display plate and increase in product thickness.

Thus, a technology that enables a display panel for displaying an image (instead of the touch screen panel) to include a light sensing pixel including a thin film transistor in addition to a pixel (a display or light emitting pixel) has been developed. The light sensing pixel may sense a change in pressure applied to a screen by a user's finger and/or a change in light to enable the LCD apparatus to find out whether the user's finger is in contact with the screen and information on a contact location. However, since the display panel includes the light sensing pixel, there is a limitation in that the aperture ratio of the display panel decreases.

SUMMARY

Aspects of exemplary embodiments of the invention provide a liquid crystal display apparatus having an enhanced aperture.

An exemplary embodiment of the present invention provides a liquid crystal display apparatus including: a pixel including a storage capacitor, wherein the storage capacitor is connected to be between a pixel electrode and a storage voltage line; a light sensing unit connected to be between the storage voltage line and a first node; and a transfer unit connected to transfer a voltage from the first node to a sensing line.

In an exemplary embodiment, the pixel may further include: a transistor connected to be between a data line and the pixel electrode, wherein the transistor includes a gate electrode connected to a gate line; and a capacitor connected to be between the pixel electrode and a common electrode.

In an exemplary embodiment, the light sensing unit may be connected to the storage voltage line and the first node and include a gate electrode connected to be controlled by a first signal.

In an exemplary embodiment, the light sensing unit may further include a first capacitor connected to be between the storage voltage line and the first node.

In an exemplary embodiment, the transfer unit may be connected to be between the first node and the sensing line and include a transfer transistor including a gate electrode, the gate electrode being connected to the gate line.

In an exemplary embodiment, the first signal may be a gate off voltage.

In an exemplary embodiment, the light sensing unit may further include a second capacitor connected to be between the first node and the first signal.

In an exemplary embodiment, the transfer unit may be connected to be between the first node and the sensing line and include a transfer transistor including a gate electrode, the gate electrode being connected to the gate line.

In an exemplary embodiment, the first signal may be provided for a next gate line connected to a next pixel adjacent to the pixel.

In an exemplary embodiment, the transfer unit may include a first transfer transistor connected to be between the storage voltage line and a second node, wherein the first transfer transistor includes a gate electrode connected to the first node; and a second transfer transistor connected to be between the second node and the sensing line, wherein the second transfer transistor includes a gate electrode connected to the gate line.

BRIEF DESCRIPTION OF THE FIGURES

The above and other features of the invention will become more apparent by describing in further detail exemplary embodiments thereof with reference to the accompanying drawings, in which.

DETAILED DESCRIPTION

Figure 1:
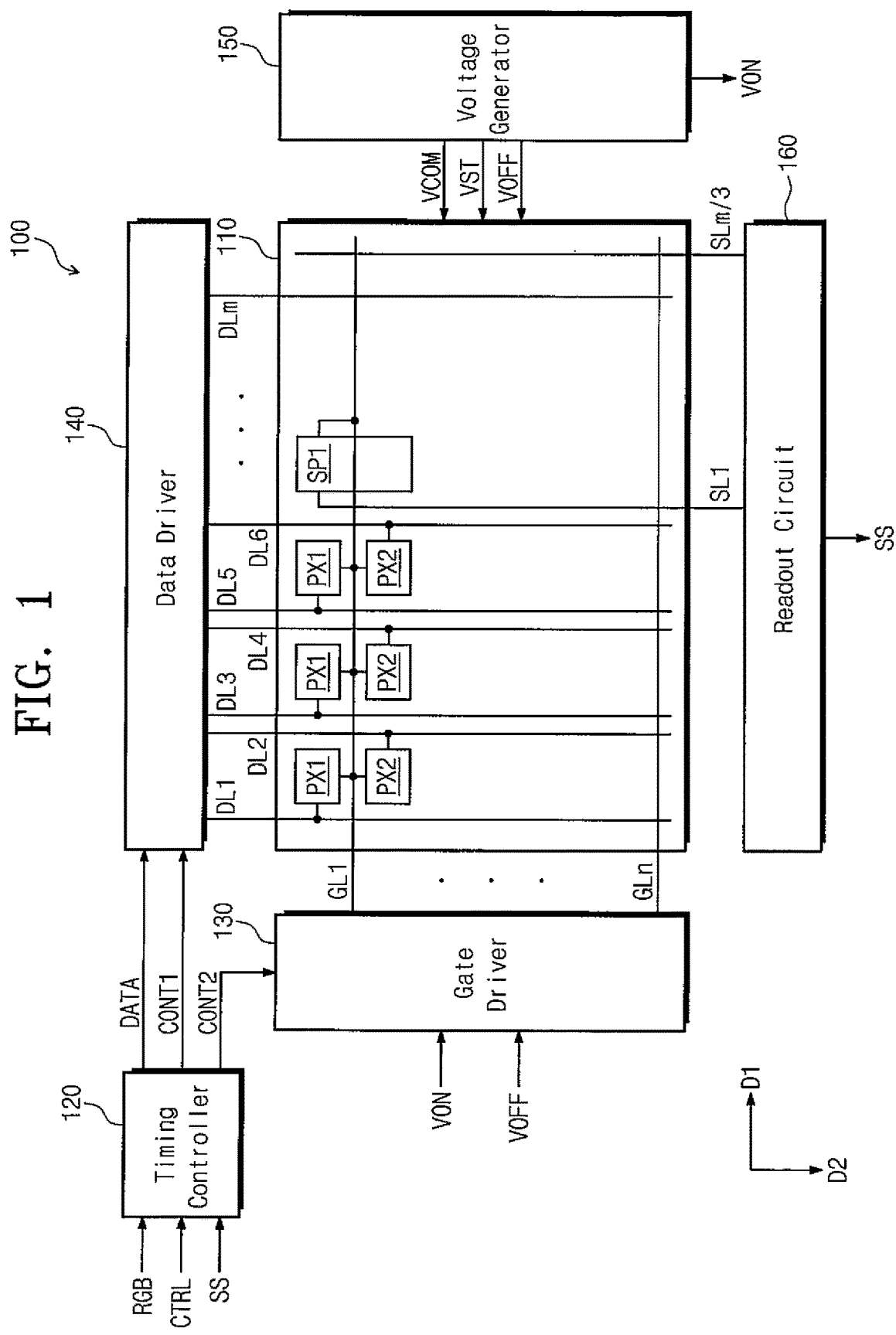
FIG. 1 is a block diagram illustrating an exemplary embodiment of a liquid crystal display (LCD) apparatus according to an embodiment of the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a block diagram illustrating an exemplary embodiment of a liquid crystal display (LCD) apparatus according to an embodiment of the present invention.

Referring to FIG. 1, an LCD apparatus 100 includes a display panel 110, a timing controller 120, a gate driver 130, a data driver 140, a voltage generator 150 and a readout circuit 160.

The display panel 110 includes a plurality of gate lines GL1 to GLn extending along a first direction D1, a plurality of data lines and extending along a second direction D2 crossing the first direction D1, a plurality of first pixels PX1, a plurality of second pixels, a plurality of sensing lines SL1 to SLm/3 extending along the second direction D2, and a plurality of light sensing pixels SP1.

The first pixels PX1, the second pixels PX2, and the light sensing pixels SP1 are connected to a gate line GLj (where j is a positive integer and $1 \leq j \leq n$). The first pixels PX1 are arranged over corresponding gate lines GLj and connected to adjacent left data lines, such as odd data lines DL1, DL3 or so, respectively. The second pixels PX2 are arranged under corresponding gate lines GLj and connected to adjacent right data lines, such as even data lines DL2, DL4 or so, respectively. Each of the plurality of light sensing pixels SP1 is connected to a corresponding one of the sensing lines SL1 to SLm/3 and to a corresponding one of the gate lines GL1 to GLn. The configurations of the pixels PX and the light sensing pixels SP1 that the display panel 110 includes are described below in more detail.

The timing controller 120 externally receives an image signal RGB and control signals CTRL for controlling the display of the image signal, such as a vertical synchronization signal, a horizontal synchronization signal, a main clock signal and a data enable signal. Also, the timing controller 120 receives a sensing signal SS from the readout circuit 160. The timing controller 120 converts the image signal RGB into a data signal DATA and outputs a first control signal CONT1 and a second control signal CONT2.

The data driver 140 outputs grayscale voltages for driving the data lines DL1 to DLm in response to the data signal DATA and the first control signal CONT1 from the timing controller 120.

The gate driver 130 drives the gate lines GL1 to GLn with any one of a gate on voltage VON and a gate off voltage VOFF in response to the second control signal CONT2 from the timing controller 120.

The gate driver 130 is implemented in a circuit that includes an amorphous silicon thin film transistor or an oxide semiconductor transistor, and may thus be on the same substrate as the display panel 110.

The voltage generator 150 generates a common voltage VCOM, a storage voltage VST, a gate on voltage VON and a gate off voltage VOFF that are needed for the operations of the display panel 110 and the gate driver 130.

The readout circuit 160 provides the timing controller 120 with the sensing signal SS corresponding to sensing voltages that are received through the sensing lines SL1 to SLm/3 from the plurality of light sensing pixels SP1.

Figure 2:
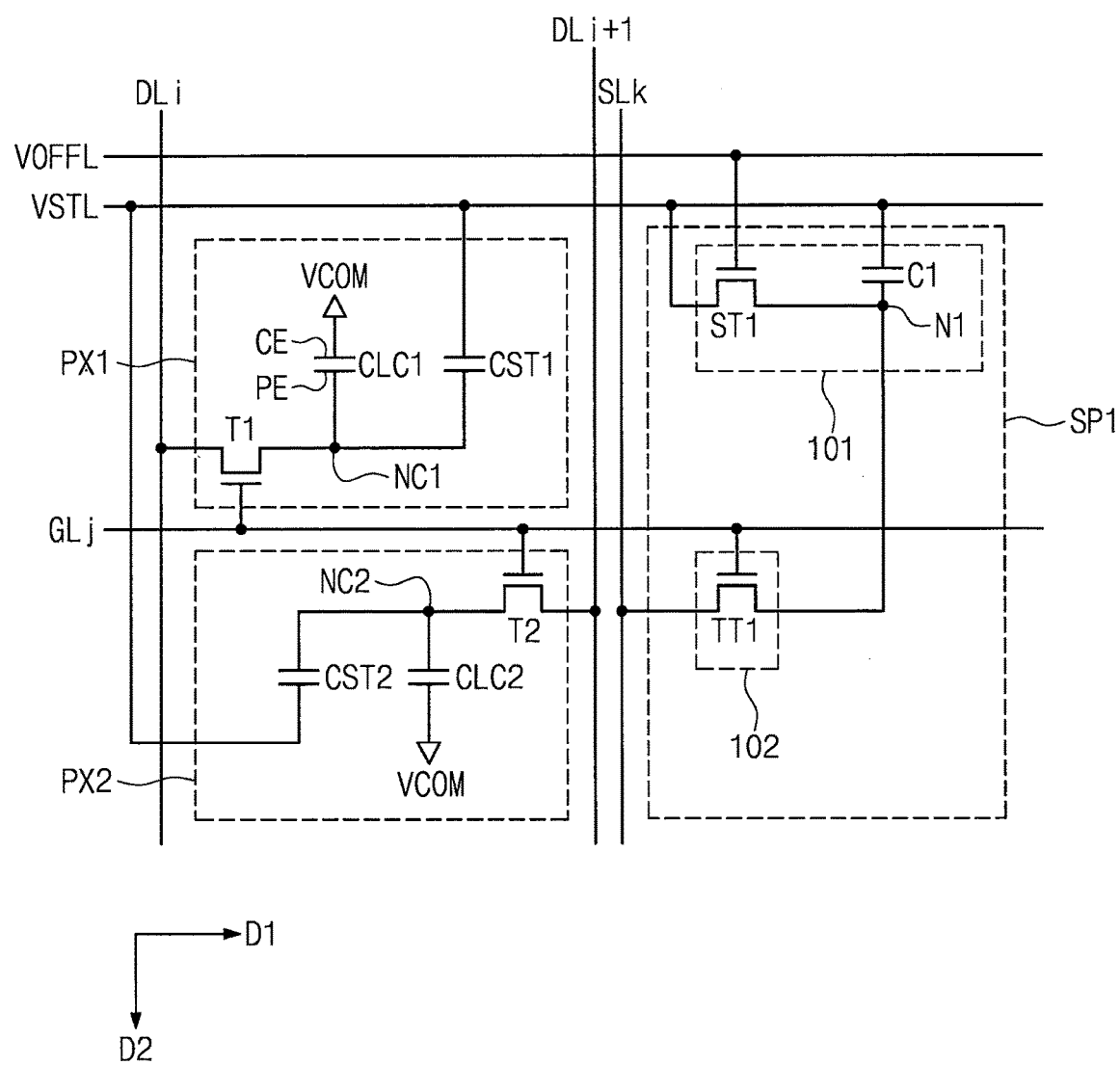
FIG. 2 is a circuit diagram illustrating an exemplary embodiment of a first pixel, a second pixel, and a light sensing pixel of the LCD apparatus in FIG. 1.

FIG. 2 is a circuit diagram of a first pixel, a second pixel, and a light sensing pixel of the LCD apparatus in FIG. 1.

Referring to FIG. 2, each of the first pixels PX1 shown in FIG. 1 includes a switching transistor T1, a liquid crystal capacitor CLC1, and a storage capacitor CST1. A storage voltage line VSTL transferring a storage voltage VST and a gate off voltage line VOFFL delivering a gate off voltage VOFF extend in a first direction D1 parallel with the gate line GLj.

The switching transistor T1 is connected to be between a corresponding data line DLi and a corresponding connection node NC1 and includes a gate electrode connected to a corresponding gate line GLj (where i is a positive integer and 1≤i≤m, and j is a positive integer and 1≤j≤n). The liquid crystal capacitor CLC1 includes a pixel electrode PE connected to the connection node NC1 and a common electrode CE connected to a common voltage VCOM. The storage capacitor CST1 is connected to be between the connection node NC1 and the storage voltage line VSTL.

Each of the second pixels PX2 in FIG. 1 includes a switching transistor T2, a liquid crystal capacitor CLC2, and a storage capacitor CST2. The switching transistor T2 is connected to be between a corresponding data line DLi+1 and a corresponding connection node NC2 and includes a gate electrode connected to a corresponding gate line GLj (where i is a positive integer and 1≤i≤m, and j is a positive integer and 1≤j≤n). The liquid crystal capacitor CLC2 is connected to be between the connection node NC2 and the common voltage VCOM. The storage capacitor CST2 is connected to be between the connection node NC2 and the storage voltage line VSTL.

As shown in FIG. 1, the sensing lines SL1 to SLm/3 are arranged so that one sensing line is provided for every six data lines, and the light sensing pixels SP1 are arranged adjacent to the sensing lines SL1 to SLm/3. In the present embodiment, the ratio of first pixels PX1 to light sensing pixels SP1 is 3:1; but in another embodiment, the ratio may be 15:1 or 30:1.

Each of the light sensing pixels SP1 includes a light sensing unit 101 and a transfer unit 102. The light sensing unit 101 includes a light sensing transistor ST1 and a capacitor C1, and the transfer unit 102 includes a transfer transistor TT1. The light sensing transistor ST1 is connected to be between the storage voltage line VSTL and a first node N1 and includes a gate electrode connected to the gate off voltage line VOFFL.

The capacitor C1 is connected to be between the first node N1 and the storage voltage line VSTL. The transfer transistor TT1 is connected to be between the first node N1 and a sensing line SLk and includes a gate electrode connected to the gate line GLj.

When an external light enters through the channel region of the light sensing transistor ST1, a photo current from the storage voltage line VSTL is charged in the capacitor C1. When the gate line GLj is driven at a gate on voltage VON level, the transfer transistor TT1 is turned on and charges charged in the capacitor C1 are transferred to the sensing line SLk. The readout circuit 160 in FIG. 1 provides the timing controller 120 with a sensing signal SS corresponding to the voltage level of the sensing line SLk.

Figure 3:
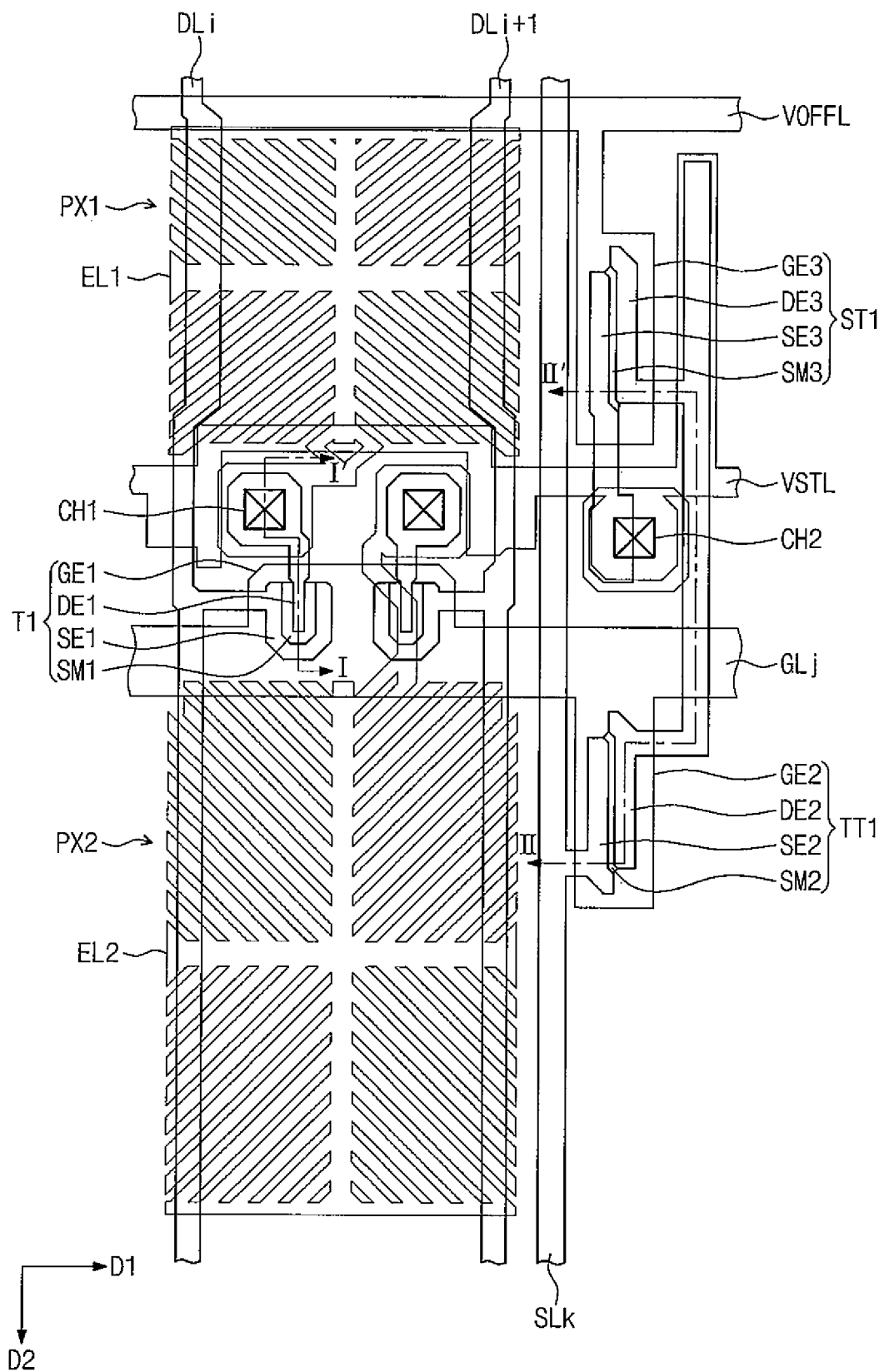
FIG. 3 is a plan view of a portion of a display panel in FIG. 1 including the light sensing pixel in FIG. 2.
Figure 4:
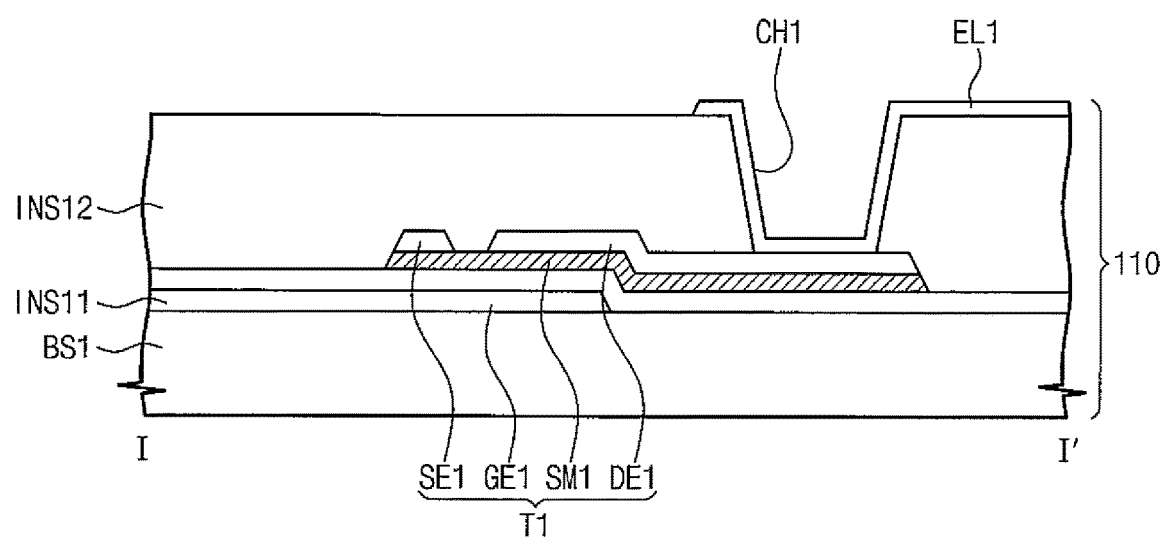
FIG. 4 is a cross sectional view taken along line I-I' of FIG. 3.
Figure 5:
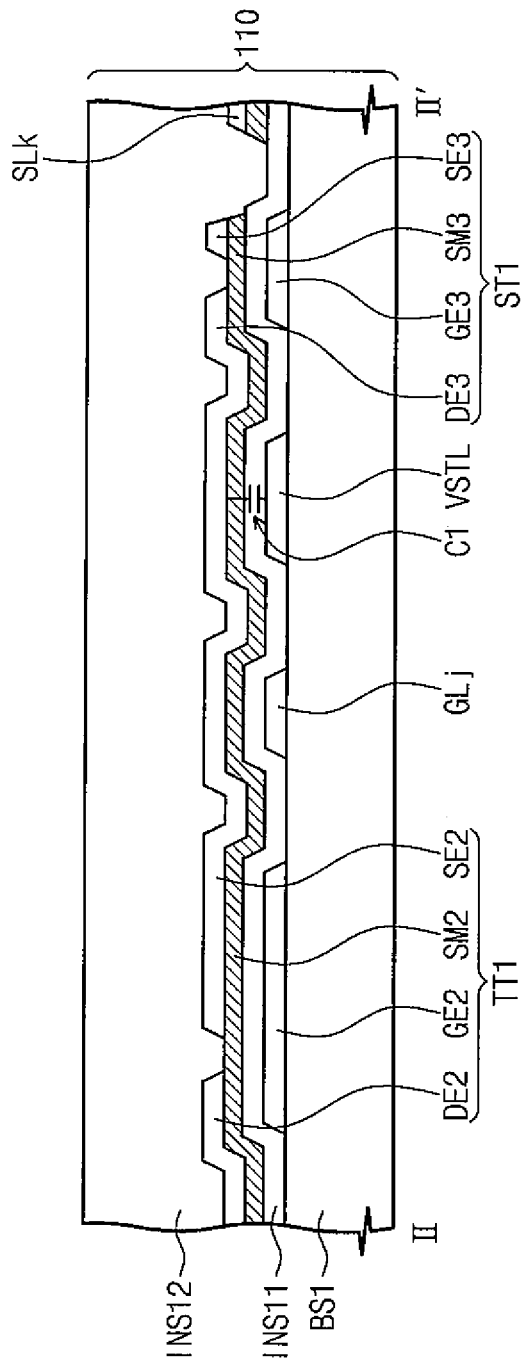
FIG. 5 is a cross sectional view taken along line II-II'.

FIG. 3 is a plan view of a portion of a display panel in FIG. 1 including the light sensing pixel in FIG. 2. FIG. 4 is a cross sectional view taken along line I-I' of FIG. 3. FIG. 5 is a cross sectional view taken along line II-II'.

For the convenience of description, FIGS. 3 to 5 show only two pixels PX1 and PX2 and a portion of a light sensing pixel SP1 adjacent to the pixels PX1 and PX2.

Referring to FIGS. 3 to 5, the display panel 110 includes a base substrate BS1. The base substrate BS1 is a transparent or opaque insulating substrate and may include a silicon substrate, a glass substrate, and a plastic substrate. The base substrate BS1 includes pixel regions that 1:1 corresponds to pixels of the display panel.

The base substrate BS1 includes a gate line GLj, data lines DLi and DLi+1, a sensing line SLk, a gate off voltage line VOFFL, pixel electrodes EL1 and EL2 1:1 corresponding to pixels PX1 and PX2, a switching transistor T1, a liquid crystal capacitor CLC, a storage capacitor CST, a light sensing transistor ST1, a capacitor C1 and a transfer transistor TT1.

The gate line GLj is extended on the base substrate BS1 in a first direction D1. The data lines DLi and DLi+1 are insulated from the gate line GLj on the base substrate BS1 and a first insulating layer INS11 is arranged between the data lines DLi and DLi+1 and the gate line GLj. The data lines DLi and DLi+ are extended in a second direction D2 crossing the first direction D1. The first insulating layer INS11 may include an insulating material such as a silicon nitride or a silicon oxide.

The switching transistor T1 is connected to the gate line GLj and the data line DLi and includes a gate electrode GE1, a semiconductor layer SM1, a source electrode SE1 and a drain electrode DE1.

The transfer transistor TT1 in the light sensing pixel SP1 is connected to the gate line GLj and the sensing line SLk and includes a gate electrode GE2, a semiconductor layer SM2, a source electrode SE2, and a drain electrode DE2.

The light sensing transistor ST1 in the light sensing pixel SP1 is connected to a gate off voltage line VOFFL and a storage voltage line VSTL and includes a gate electrode GE3, a semiconductor layer SM2, a source electrode SE3, and a drain electrode DE3.

Each of the gate electrodes GE1 and GE2 protrudes from the gate line GLj or is provided on a portion of the gate line GLj. The gate electrode GE3 protrudes from the gate off voltage line VOFFL or is provided on a portion of the gate off voltage line VOFFL.

The gate line GLj, the gate off voltage line VOFFL and the gate electrodes GE1 to GE3 may be formed of metal. The gate line GLj, the gate off voltage line VOFFL and the gate electrodes GE1 to GE3 may be formed of nickel, chrome, molybdenum, aluminum, titanium, copper, tungsten, and alloy including them. The gate line GLj, the gate off voltage line VOFFL and the gate electrodes GE1 to GE3 may be formed in a single layer or multiple layers using (utilizing) metal. For example, the gate line GLj, the gate off voltage line VOFFL and the gate electrodes GE1 to GE3 may be triple layers where molybdenum, aluminum, and molybdenum are sequentially stacked, or double layers where titanium and copper are sequentially stacked. Alternatively, each may be a single layer of titanium-copper alloy.

The first insulating layer INS11 is provided on the front of the base substrate BS1 to cover the gate electrodes GE1 and GE2. The semiconductor layer SM1 is provided over the gate line GLj and the gate electrode GE1, with the first insulating layer INS11 therebetween. The semiconductor layer SM2 is provided over the gate electrodes GE2 and GE3, with the first insulating layer INS11 therebetween.

The source electrode SE1 of the switching transistor T1 is branched from the data line DLi and overlaps the semiconductor layer SM1. The drain electrode DE1 is spaced apart from the source electrode SE1 on the semiconductor layer SM1. In this example, the semiconductor layer SM1 forms a conductive channel between the source electrode SE1 and the drain electrode DE1.

The source electrode SE3 of the light sensing transistor ST1 is branched from the storage voltage line VSTL and overlaps the semiconductor layer SM3. The drain electrode DE3 is spaced apart from the source electrode SE3 on the semiconductor layer SM3. The semiconductor layer SM3 forms a conductive channel between the source electrode SE3 and the drain electrode DE3.

The drain electrode DE2 of the transfer transistor TT1 is branched from the sensing line SLk and overlaps the semiconductor layer SM2. The source electrode SE2 is spaced apart from the drain electrode DE2 on the semiconductor layer SM2. The semiconductor layer SM2 forms a conductive channel between the source electrode SE2 and the drain electrode DE2.

Each of the source electrodes SE1 to SE3 and the drain electrodes DE1 to DE3 may be formed of a conductive material such as metal. Each of the source electrodes SE1 to SE3 and the drain electrodes DE1 to DE3 may be formed of single metal but the present invention is not limited thereto. For example, the source electrodes SE1 to SE3 and the drain electrodes DE1 to DE3 may be formed of two kinds of metal, or an alloy of two or more kinds of metal. The metal includes nickel, chrome, molybdenum, aluminum, titanium, copper, tungsten, and alloy including them. Also, each of the source electrodes SE1 to SE3 and the drain electrodes DE1 to DE3 may be formed in a single layer or multiple layers. For example, each of the source electrodes SE1 to SE3 and the drain electrodes DE1 to DE3 may be formed in double layers that are formed of titanium and copper.

A second insulating layer INS12 is provided on the front of the base substrate BS1 to cover the source electrode SE1 and drain electrode DE1 of the first pixel PA, the source electrode SE3 and drain electrode DE3 of the light sensing transistor ST1 and the source electrode SE2 and drain electrode DE2 of the transfer transistor TT1. The second insulating layer INS12 is formed of an inorganic insulating material or an organic insulating material and may have a flat surface. An example of the inorganic insulating material may be a silicon nitride and a silicon oxide. The second insulating layer INS12 includes a contact hole (opening) CH1 through which a portion of the drain electrode DE1 is exposed.

A pixel electrode EI1 is formed on the second insulating layer INS12. The pixel electrode EL1 of the first pixel PX1 is connected physically or electrically to the drain electrode DE1 through the contact hole (opening) CH1 and receives a grayscale voltage through the drain electrode DE1.

Figure 6:
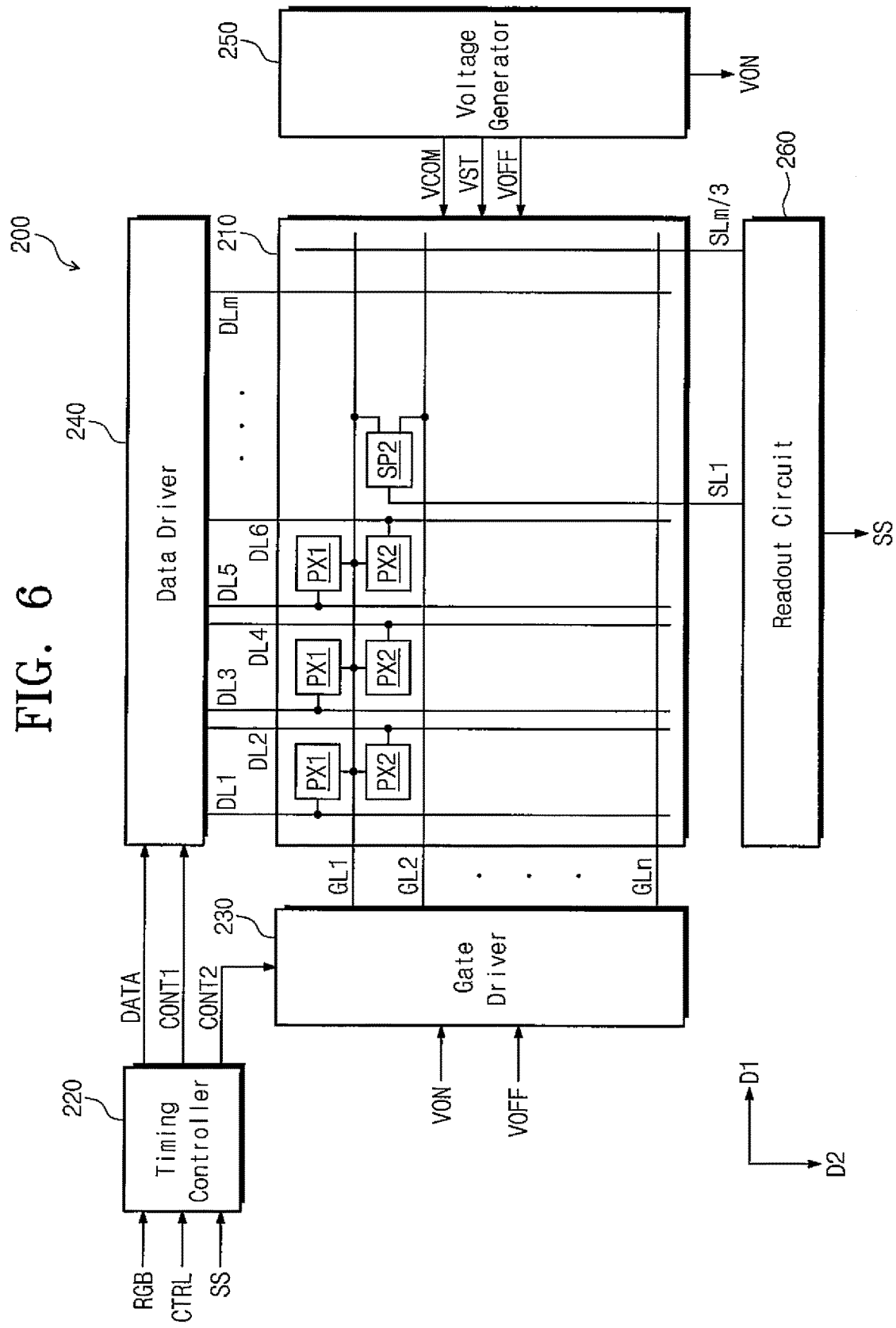
FIG. 6 is a block diagram of an LCD apparatus according to another embodiment of the present invention.

FIG. 6 is a block diagram of an LCD apparatus according to another embodiment of the present invention.

Referring to FIG. 6, an LCD apparatus 200 includes a display panel 210, a timing controller 220, a gate driver 230, a data driver 240, a voltage generator 250 and a readout circuit 260. Because the timing controller 220, the gate driver 230, the data driver 240, the voltage generator 250 and the readout circuit 260 of the LCD apparatus 200 in FIG. 6 operate in the same manner as the timing controller 120, the gate driver 130, the data driver 140, the voltage generator 150 and the readout circuit 160 of the LCD apparatus 100 in FIG. 1, a repetitive description is not provided.

The display panel 210 includes a plurality of gate lines GL1 to GLn extending along a first direction D1, a plurality of data lines DL1 to DLm extending along a second direction D2 crossing the first direction D2, a plurality of first pixels PX1, a plurality of second pixels, a plurality of sensing lines SL1 to SLm/3 extending along the second direction D2, and a plurality of light sensing pixels SP2.

The first pixels PX1, the second pixels PX2, and the light sensing pixels SP2 are connected to a gate line GLj (where j is a positive integer and $1 \leq j \leq n$). The first pixels PX1 are arranged over gate lines GLj and connected to adjacent left data lines, such as odd data lines DL1, DL3, etc., respectively. The second pixels PX2 are arranged under gate lines GLj and connected to adjacent right data lines, such as even data lines DL2, DL4, etc., respectively. Each of the plurality of light sensing pixels SP2 is connected to a corresponding one of the sensing lines SL1 to SLm/3 and to two adjacent gate lines among the gate lines GL1 to GLn.

Figure 7:
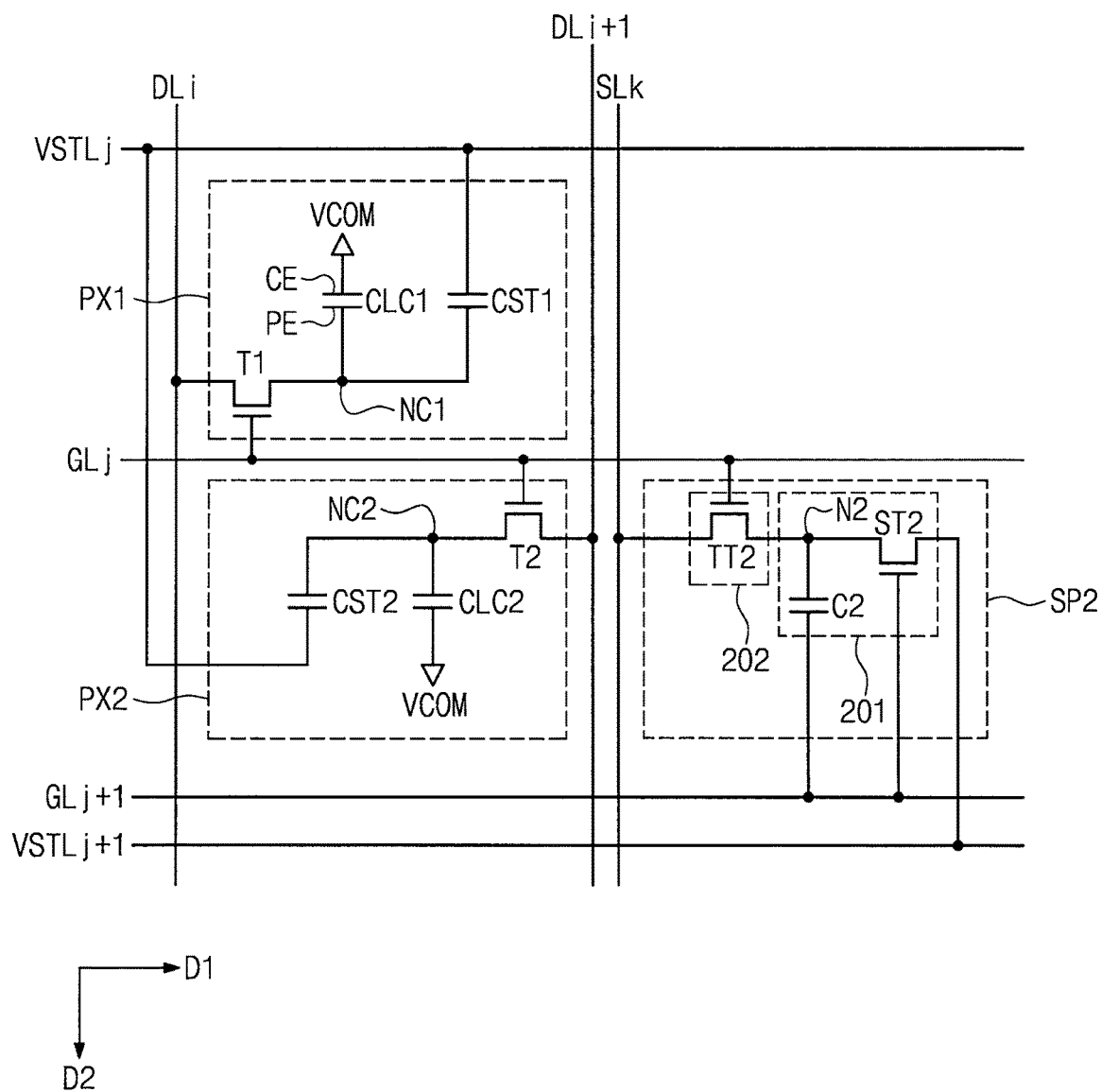
FIG. 7 is an exemplary circuit diagram of a first pixel, a second pixel, and a light sensing pixel of the LCD apparatus in FIG. 6.

FIG. 7 is an exemplary circuit diagram of a first pixel, a second pixel, and a light sensing pixel of the LCD apparatus in FIG. 6.

Referring to FIG. 7, each of the first pixels PX1 in FIG. 6 includes a switching transistor T1, a liquid crystal capacitor CLC1, and a storage capacitor CST1. Each of the second pixels PX2 in FIG. 6 includes a switching transistor T2, a liquid crystal capacitor CLC2, and a storage capacitor CST2. The first pixels PX1 and the second pixels PX2 in FIG. 7 have the same configuration as the first pixels PX1 and the second pixels PX2 in FIG. 2, so the same reference numerals are used and a repetitive description is not provided.

Each of the light sensing pixels SP2 includes a light sensing unit 201 and a transfer unit 202. The light sensing unit 201 includes a light sensing transistor ST2 and a capacitor C2, and the transfer unit 202 includes a transfer transistor TT2. The light sensing transistor ST is connected to be between a storage voltage line VSTL and a second node N2 and includes a gate electrode connected to the next gate line GLj+1.

The capacitor C2 is connected to be between the second node N2 and the next gate line GLj+1. The transfer transistor TT2 is connected to be between the second node N2 and a corresponding sensing line SLk and includes a gate electrode connected to the gate line GLj.

When an external light enters through the channel region of the light sensing transistor ST2, a photo current from the storage voltage line VSTL is charged in the capacitor C2. When the gate line GLj is driven at a gate on voltage VON level, the transfer transistor TT2 is turned on and charges charged in the capacitor C2 are transferred to the sensing line SLk. The readout circuit 260 in FIG. 6 provides the timing controller 220 with a sensing signal SS corresponding to the voltage level of the sensing line SLk.

Figure 8:
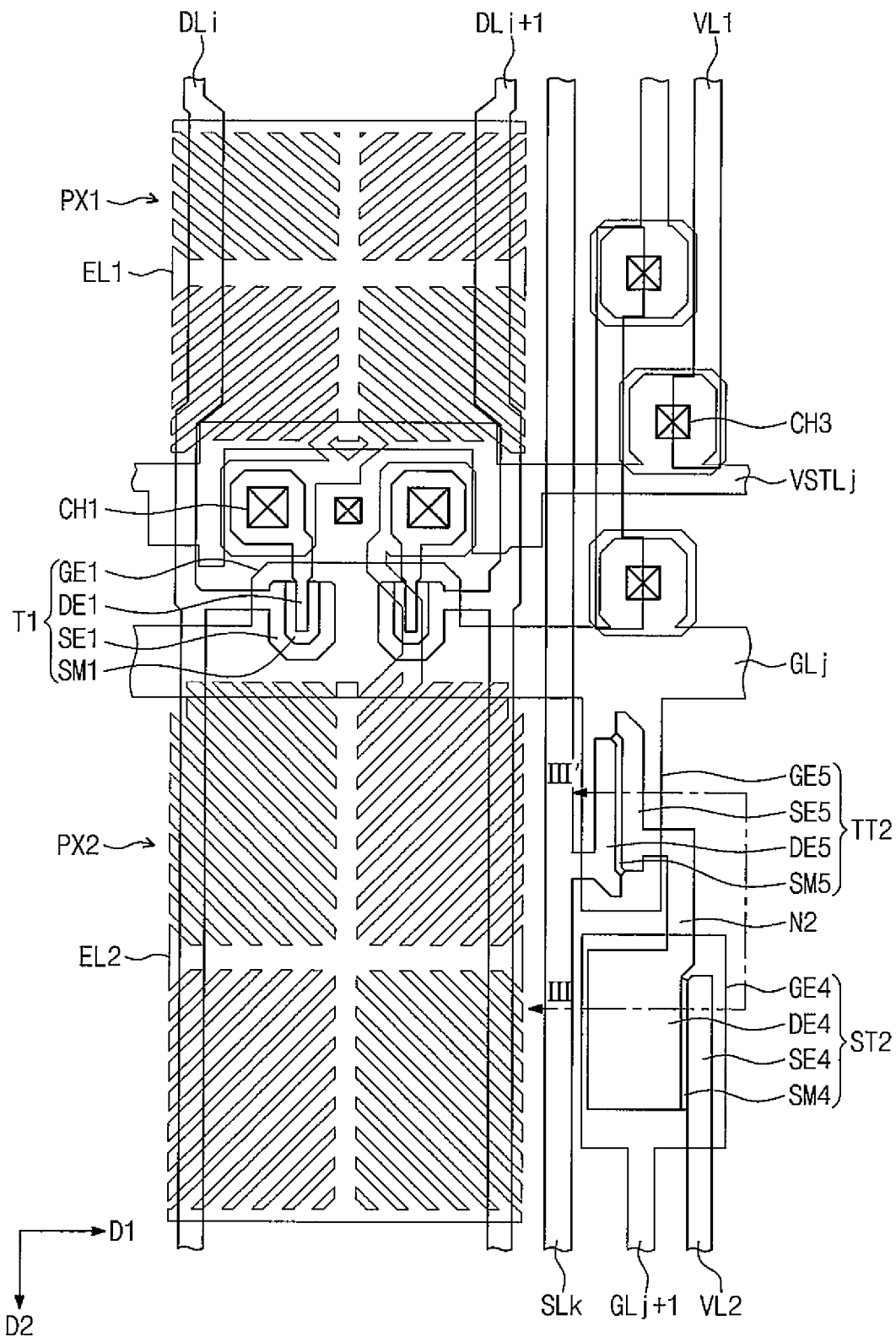
FIG. 8 is a plan view of a portion of a display panel in FIG. 6 including the light sensing pixel in FIG. 7.
Figure 9:
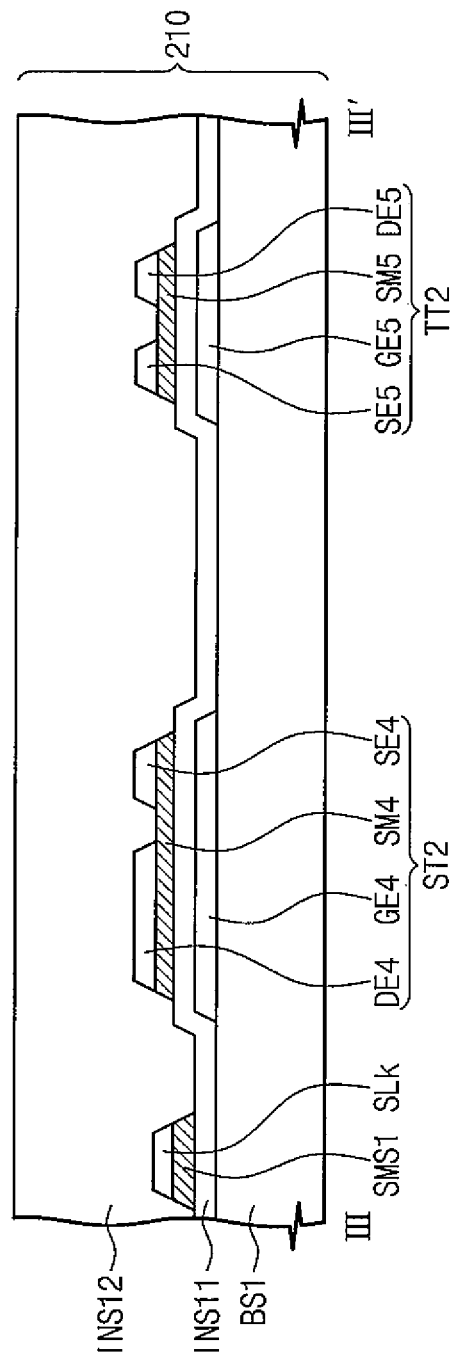
FIG. 9 is a cross sectional view taken along line III-III' of FIG. 3.

FIG. 8 is a plan view of a portion of a display panel in FIG. 6 including the light sensing pixel in FIG. 7. FIG. 9 is a cross sectional view taken along line III-III' of FIG. 3.

For the convenience of description, FIG. 9 shows only two pixels PX1 and PX2 and a portion of a light sensing pixel SP1 adjacent to the pixels PX1 and PX2.

Referring to FIGS. 7 to 9, the display panel 210 includes a base substrate BS2. The base substrate BS2 is a transparent or opaque insulating substrate and may include a silicon substrate, a glass substrate, and a plastic substrate.

The base substrate BS2 includes a gate line GLj, data lines DLi and DLi+1, a sensing line SLk, a gate off voltage line VOFFL, pixel electrodes EL1 and EL2 1:1 corresponding to a plurality of pixels PX1 and PX2, a switching transistor T2, a liquid crystal capacitor CLC1, a storage capacitor CST1, a light sensing transistor ST2, a capacitor C2 and a transfer transistor TT2.

The structures of the switching transistor T2, the liquid crystal capacitor CLC1 and the storage capacitor CST1 in the first pixel PX1 are similar to those of FIG. 4, so a repetitive description is not provided.

The light sensing transistor ST2 in the light sensing pixel SP2 includes a gate electrode GE4, a semiconductor layer SM4, a source electrode SE4, and a drain electrode DE4. The gate electrode GE4 is branched from the next gate line GLj+1. The source electrode SE4 is connected to a storage voltage line VSTLj+1 through a voltage line VL2 and overlaps the semiconductor layer SM4. The drain electrode DE4 is spaced apart from the source electrode SE4 on the semiconductor layer SM4 and connected to the drain electrode DE5 of the transfer transistor TT2 through the second node N2. The semiconductor layer SM4 forms a conductive channel between the source electrode SE4 and the drain electrode DE4.

The transfer transistor TT2 in the light sensing pixel SP2 is connected to the gate line GLj and the sensing line SLk and includes a gate electrode GE5, a semiconductor layer SM5, a source electrode SE5, and the drain electrode DE5. The gate electrode GE5 protrudes from the gate line GLj or is provided on a portion of the gate line GLj. The source electrode SE5 is branched from the sensing line SLk and overlaps the semiconductor layer SM5. The drain electrode DE5 is spaced apart from the source electrode SE5 on the semiconductor layer SM5. The semiconductor layer SM5 forms a conductive channel between the source electrode SE5 and the drain electrode DE5.

The sensing line SLk is formed on a semiconductor layer SMS1. A storage voltage line VSTLj and a voltage line VL1 are connected through a contact hole (opening) CH3. Similarly, the storage voltage line VSTLj+1 and a voltage line VL2 are connected through a contact hole (opening).

The second insulating layer INS22 is provided on the front of the base substrate BS2 to cover the source electrode SE4 and drain electrode DE4 of the light sensing transistor ST2, and the source electrode SE5 and drain electrode DE5 of the transfer transistor TT2. The second insulating layer INS22 is formed of an inorganic insulating material or an organic insulating material and may have a flat surface. An example of the inorganic insulating material may be a silicon nitride and a silicon oxide.

Figure 10:
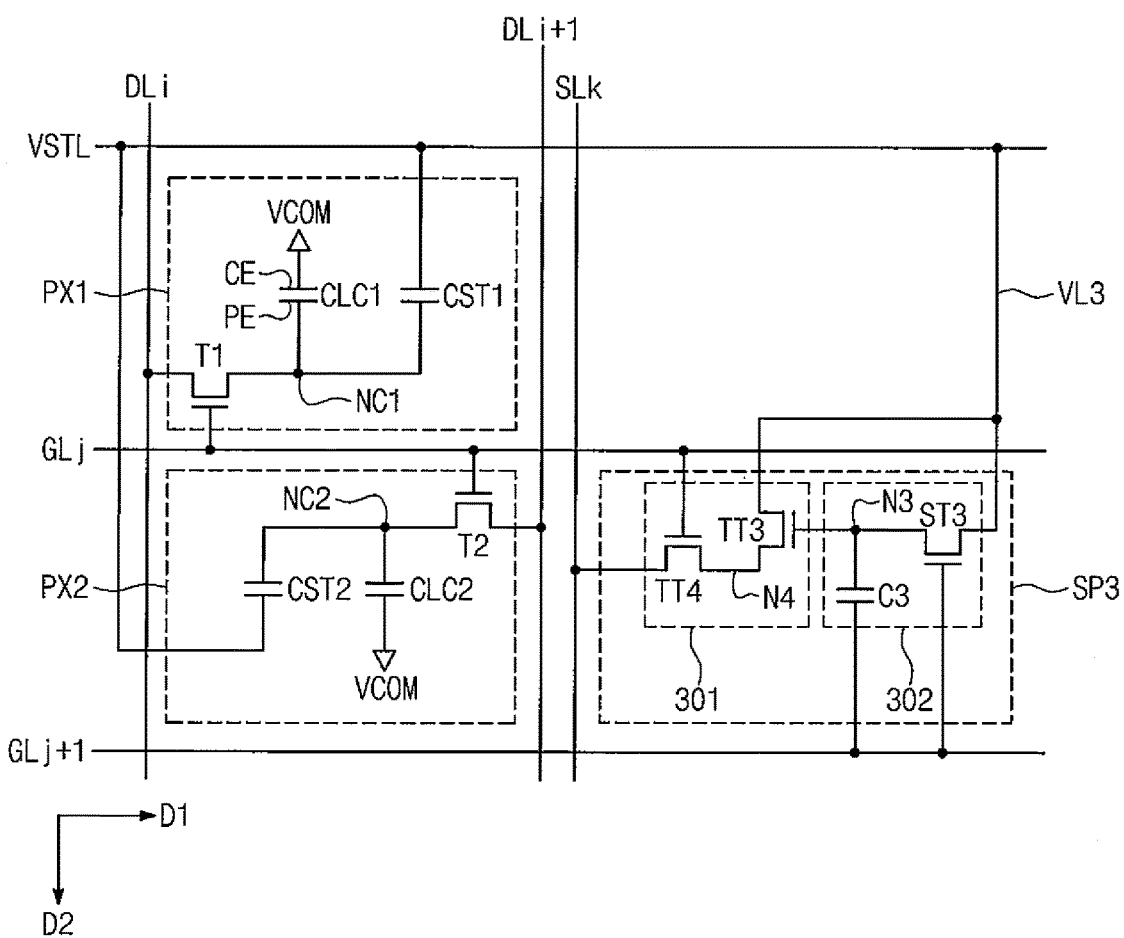
FIG. 10 is another exemplary circuit diagram of a first pixel, a second pixel, and a light sensing pixel of the LCD apparatus in FIG. 6.

FIG. 10 is another exemplary circuit diagram of a first pixel, a second pixel, and a light sensing pixel of the LCD apparatus in FIG. 6.

Referring to FIG. 10, each of the first pixels PX1 in FIG. 6 includes a switching transistor T1, a liquid crystal capacitor CLC1, and a storage capacitor CST1. Each of the second pixels PX2 in FIG. 6 includes a switching transistor T2, a liquid crystal capacitor CLC2, and a storage capacitor CST2. The first pixels PX1 and the second pixels PX2 in FIG. 10 have the same configuration as the first pixels PX1 and the second pixels PX2 in FIG. 2, so the same reference numerals are used and a repetitive description is not provided.

Each of the light sensing pixels SP2 includes a light sensing unit 301 and a transfer unit 302. The light sensing unit 301 includes a light sensing transistor ST3 and a capacitor C3, and the transfer unit 302 includes a first transfer transistor TT3 and a second transfer transistor TT4. The light sensing transistor ST3 is connected to be between a storage voltage line VSTL and a third node N3 and includes a gate electrode connected to the next gate line GLj+1. The capacitor C3 is connected to be between the third node N3 and the next gate line GLj+1.

The first transfer transistor TT3 is connected to be between the storage voltage line VSTL and a fourth node N4 and includes a gate electrode connected to the third node N3. The second transfer transistor TT4 is connected to be between a sensing line SLk and the fourth node N4 and includes a gate electrode connected to a gate line GLj.

When an external light enters through the channel region of the light sensing transistor ST3, a photo current from the storage voltage line VSTL is charged in the capacitor C3. When the gate line GLj is driven at a gate on voltage VON level, a current corresponding to a charge charged in the capacitor C2 is transferred to the sensing line SLk through the first transfer transistor TT3 and the second transfer transistor TT4. The readout circuit 260 in FIG. 6 provides the timing controller 220 with a sensing signal SS corresponding to the voltage level of the sensing line SLk.

Figure 11:
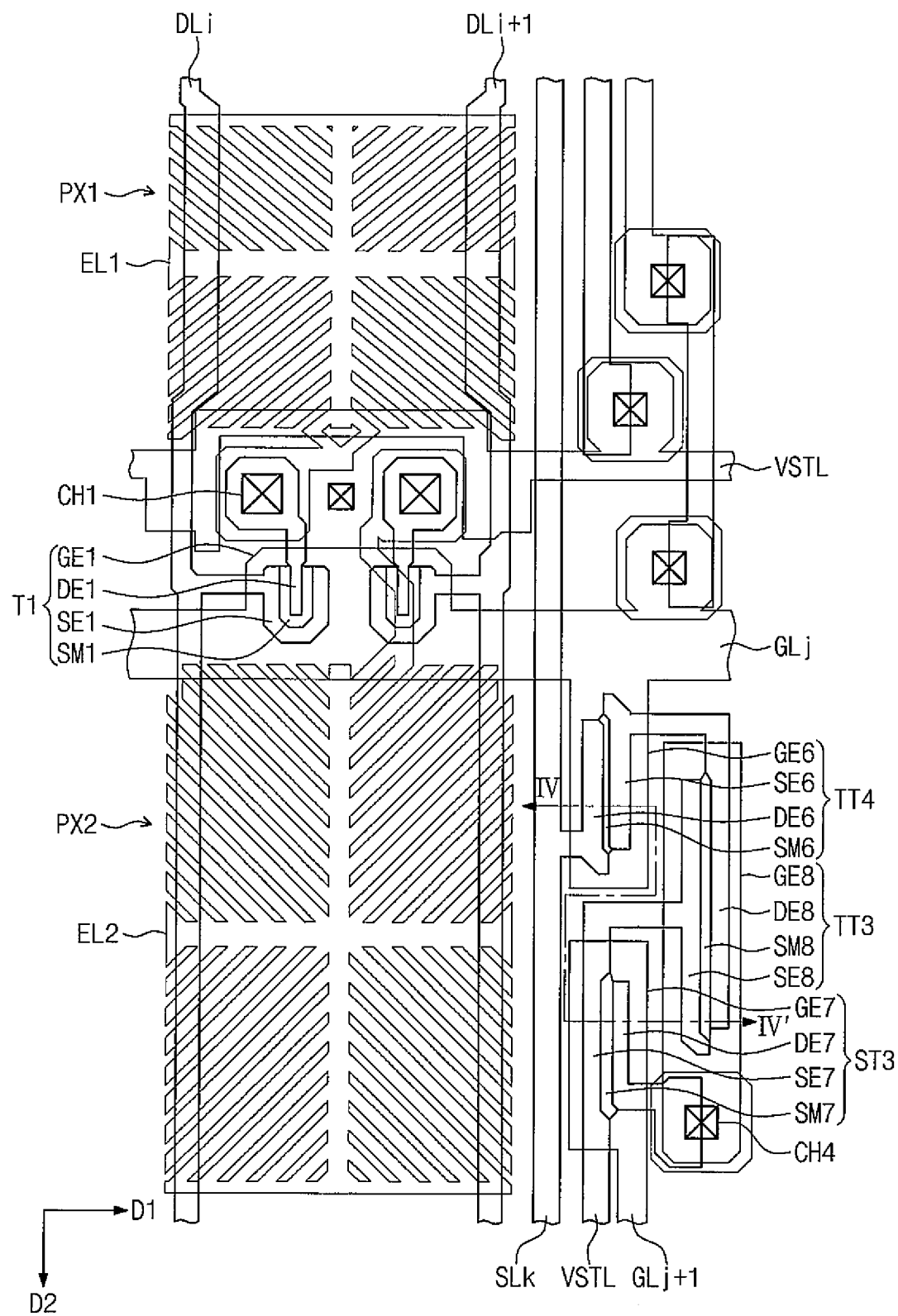
FIG. 11 is a plan view of a portion of a display panel in FIG. 6 including the light sensing pixel in FIG. 10.
Figure 12:
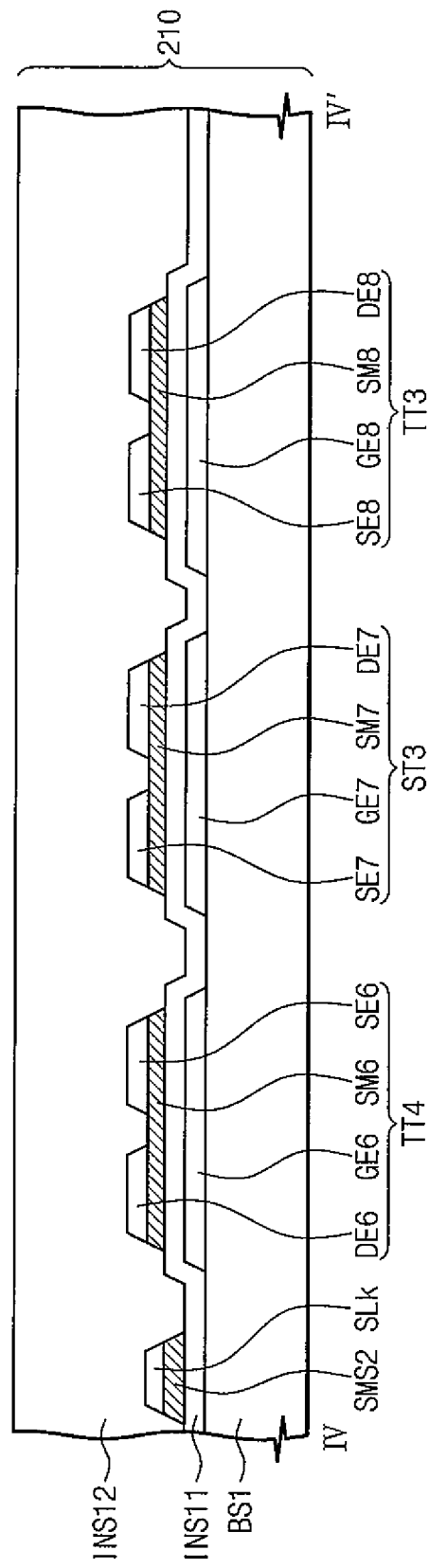
FIG. 12 is a cross sectional view taken along line IV-IV of FIG. 3.

FIG. 11 is a plan view of a portion of a display panel in FIG. 6 including the light sensing pixel in FIG. 10. FIG. 12 is a cross sectional view taken along line IV-IV' of FIG. 3.

For the convenience of description, FIG. 12 shows only two pixels PX1 and PX2 and a portion of a light sensing pixel SP3 adjacent to the pixels PX1 and PX2.

Referring to FIGS. 10 to 12, the display panel 210 includes a base substrate BS3. The base substrate BS3 is a transparent or opaque insulating substrate and may include a silicon substrate, a glass substrate, and a plastic substrate.

The base substrate BS3 includes a gate line GLj, data lines DLi and DLi+1, a sensing line SLk, pixel electrodes EL1 and EL2 1:1 corresponding to a plurality of pixels PX1 and PX2, a switching transistor T2, a liquid crystal capacitor CLC1, a storage capacitor CST1, a light sensing transistor ST2, a capacitor C2 and a transfer transistor TT2.

The structures of the switching transistor T2, the liquid crystal capacitor CLC1 and the storage capacitor CST1 in the first pixel PX1 are similar to those of FIG. 4, so a repetitive description is not provided.

The light sensing transistor ST3 in the light sensing pixel SP3 includes a gate electrode GE7, a semiconductor layer SM7, a source electrode SE7, and a drain electrode DE7. The gate electrode GE7 is branched from the next gate line GLj+1. The source electrode SE7 is branched from the storage voltage line VSTL and overlaps the semiconductor layer SM7. The drain electrode DE7 is spaced apart from the source electrode SE7 on the semiconductor layer SM7 and connected to a gate electrode GE8 of the first transfer transistor TT3 through a contact hole (opening) CH4. The semiconductor layer SM7 forms a conductive channel between the source electrode SE7 and the drain electrode DE7.

The first transfer transistor TT3 in the light sensing pixel SP3 includes the gate electrode GE8, a semiconductor layer SM8, a source electrode SE8, and a drain electrode DE8. The gate electrode GE8 is connected to the drain electrode DE7 of the light sensing transistor ST3 through the contact hole (opening) CH4. The source electrode SE8 is connected to the storage voltage line VSTL through the source electrode SE7 of the light sensing transistor ST3 and overlaps the semiconductor layer SM8. The drain electrode DE8 is spaced apart from the source electrode SE8 on the semiconductor layer SM8. The semiconductor layer SM8 forms a conductive channel between the source electrode SE8 and the drain electrode DE8.

The second transfer transistor TT4 includes a gate electrode GE6, a semiconductor layer SM6, a source electrode SE6, and a drain electrode DE6. The gate electrode GE8 is branched from the gate line GLj. The source electrode SE6 is connected to the drain electrode DE8 of the first transfer transistor TT3 and overlaps the semiconductor SM6. The drain electrode DE6 is spaced apart from the source electrode SE6 on the semiconductor layer SM6 and connected to the sensing line SLk. The semiconductor layer SM6 forms a conductive channel between the source electrode SE6 and the drain electrode DE6. The sensing line SLk is formed on a semiconductor layer SMS2. The second insulating layer INS32 is provided on the front of the base substrate BS3 to cover the source electrode SE8 and drain electrode DE8 of the light sensing transistor ST3, the source electrode SE7 and drain electrode DE7 of the first transfer transistor TT3 and the source electrode SE6 and drain electrode DE6 of the second transfer transistor TT4. The second insulating layer INS32 is formed of an inorganic insulating material or an organic insulating material and may have a flat surface. An example of the inorganic insulating material may be a silicon nitride and a silicon oxide.

Figure 13:
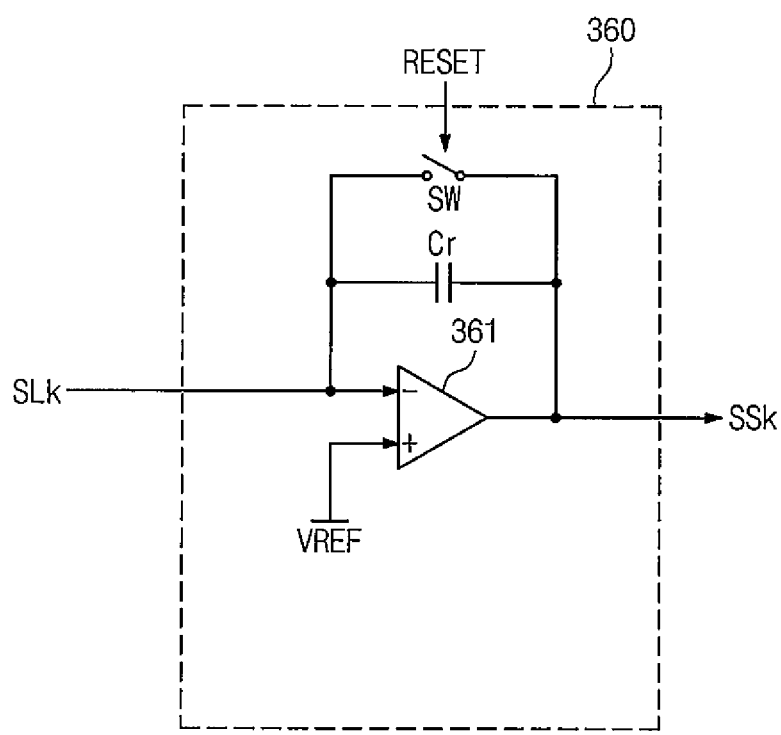
FIG. 13 shows an example of a portion of a readout circuit according to an embodiment of the present invention.

FIG. 13 shows an example of a portion of a readout circuit according to an embodiment of the present invention.

Referring to FIG. 13, a readout circuit 360 includes a comparator 361, a capacitor Cr and a switch SW. The comparator 361 receives a reference voltage VREF and a voltage transferred through the sensing line SLk of the display panel in FIG. 1 and outputs a sensing signal SSk. The capacitor Cr is connected to be between the sensing line SLk and the output terminal of the comparator 361. The switch SW is connected to be between the sensing line SLk and the output terminal of the comparator 361 to be parallel with the capacitor Cr. The switch SW operates in response to a reset signal RESET. The reset signal RESET may be provided from the timing controller 120 in FIG. 1.

Figure 14:
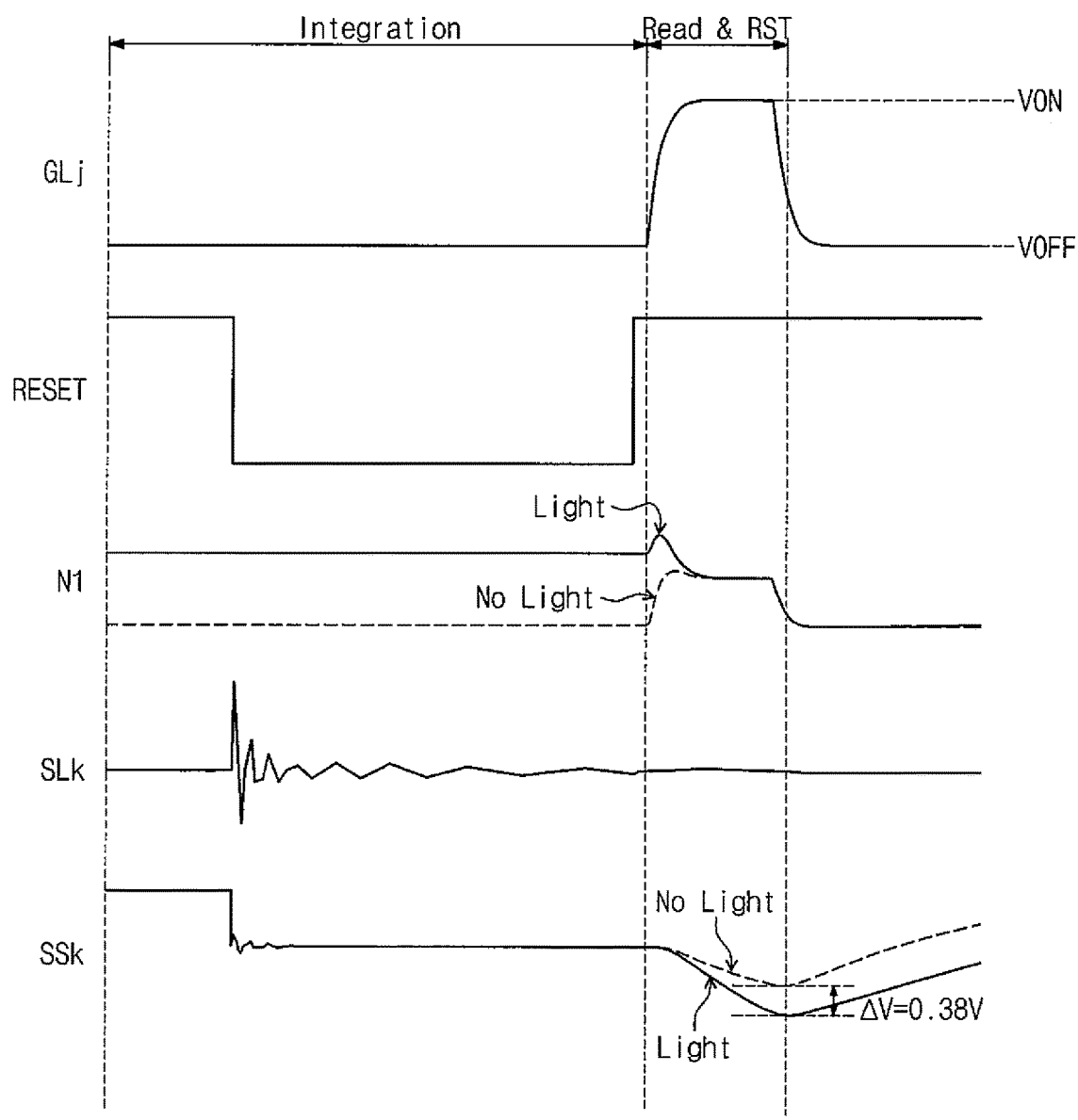
FIG. 14 is a timing diagram that shows an operational example of the readout circuit in FIG. 13.

FIG. 14 is a timing diagram that shows an operational example of the readout circuit in FIG. 13.

Referring to FIGS. 2, 13 and 14, the voltage level of the first node N1 varies depending on the presence/absence of light. During the Integration section where the gate line GLi is driven at a gate off voltage VOFF, a charge corresponding to light is charged in the capacitor C1 by the light sensing transistor ST1. During the Read & RST section where the gate line GLj is driven at a gate on voltage VON, the transfer transistor TT1 transfers a charge from the node N1 to the sensing line SLk. After the switch is ON in response to the reset signal RESET, the comparator 361 outputs a sensing signal SSk corresponding to the difference between the voltage level of the sensing line SLk and the reference voltage VREF.

Figure 15:
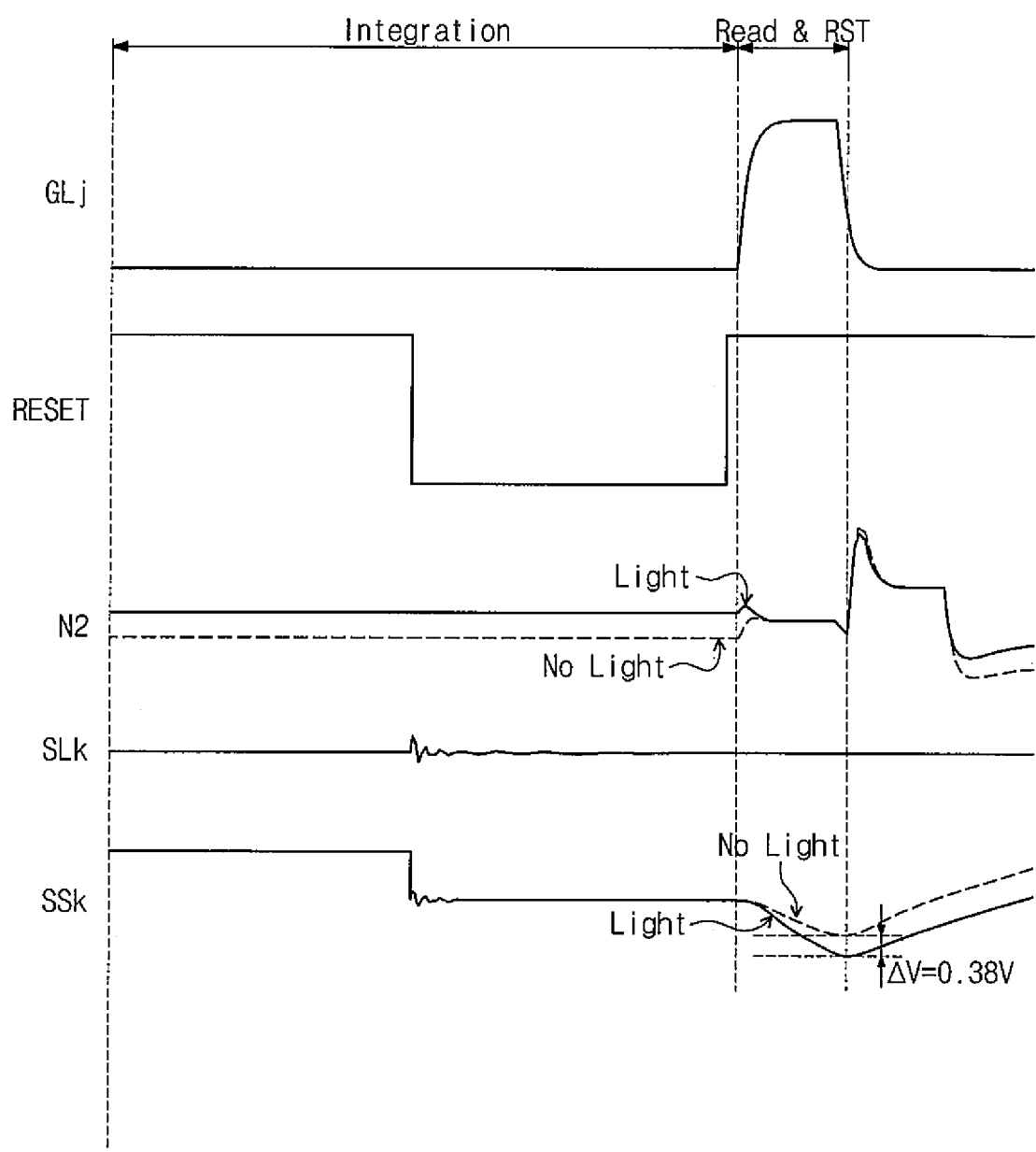
FIG. 15 is a timing diagram that shows another operational example of the readout circuit in FIG. 13.

FIG. 15 is a timing diagram that shows another operational example of the readout circuit in FIG. 13.

The readout circuit 360 in FIG. 13 receives a reference voltage VREF and a voltage transferred through the sensing line SLk of the display panel in FIG. 6 and outputs a sensing signal SSk.

Referring to FIGS. 7, 13 and 15, the voltage level of the second node N2 varies depending on the presence/absence of light. During the Integration section where the gate line GLi is driven at a gate off voltage VOFF, a charge corresponding to light is charged in the capacitor C2 by the light sensing transistor ST2. During the Read & RST section where the gate line GLj is driven at a gate on voltage VON, the transfer transistor TT2 transfers a charge from the node N2 to the sensing line SLk. After the switch is ON in response to the reset signal RESET, the comparator 361 outputs a sensing signal SSk corresponding to the difference between the voltage level of the sensing line SLk and the reference voltage VREF.

Figure 16:
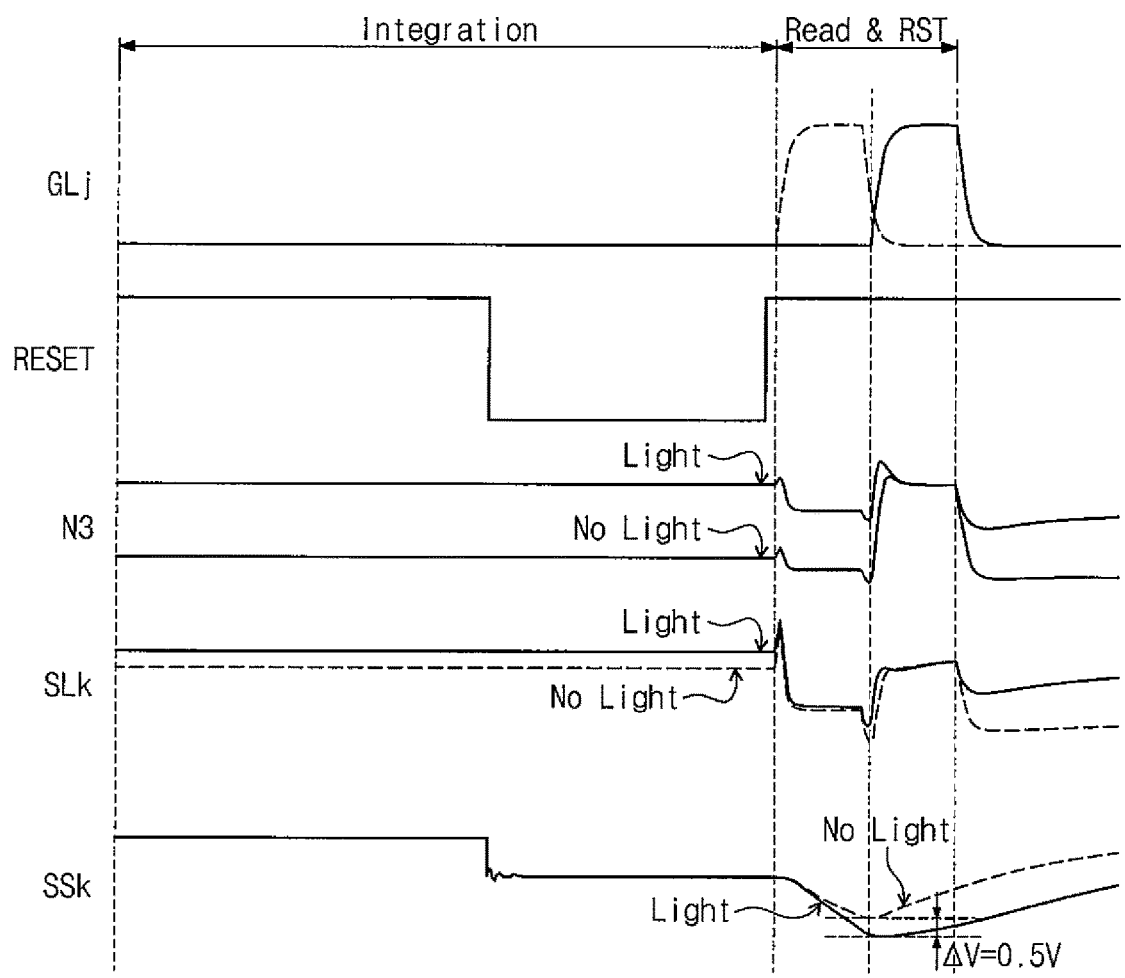
FIG. 16 is a timing diagram that shows still another operational example of the readout circuit in FIG. 13.

FIG. 16 is a timing diagram that shows still another operational example of the readout circuit in FIG. 13.

The readout circuit 360 in FIG. 13 receives a reference voltage VREF and a voltage transferred through the sensing line SLk of the display panel 210 in FIG. 6 and outputs a sensing signal SSk.

Referring to FIGS. 10, 13 and 16, the voltage level of the third node N3 varies depending on the presence/absence of light. During the Integration section where the gate line GLi is driven at a gate off voltage VOFF, a charge corresponding to light is charged in the capacitor C3 by the light sensing transistor ST3. During the Read & RST section where the gate line GLj is driven at a gate on voltage VON, the transfer transistor TT2 transfers a charge from the node N2 to the sensing line SLk. After the switch is ON in response to the reset signal RESET, the comparator 361 outputs a sensing signal SSk corresponding to the difference between the voltage level of the sensing line SLk and the reference voltage VREF.

Such an LCD apparatus according to embodiments of the present invention uses (utilizes) the driving voltage of the light sensing pixel as a storage voltage used (utilized) in a pixel, so an aperture ratio is enhanced.

It would be understood that the scope of the present is not limited to embodiments disclosed herein. Rather, the scope of the present invention includes both various variations and similar configurations. Thus, recitations of the following claims and equivalents thereof should be widely construed to include both such variations and similar configurations.

What is claimed is:
1. A liquid crystal display apparatus comprising:
a first pixel connected to a gate line and a first data line and comprising a storage capacitor, the storage capacitor being connected to be between a pixel electrode and a storage voltage line;
a second pixel connected to the gate line and a second data line;
a light sensing unit configured to detect an external light, the light sensing transistor being connected to be between the storage voltage line and a first node and comprising a gate electrode connected to a first voltage line;

a first capacitor connected to be between the storage voltage line and the first node; and a transfer unit connected to be between the first node and a sensing line and comprising a gate electrode connected to the gate line.

2. The liquid crystal display apparatus of claim 1, wherein the first pixel further comprises:

a transistor connected to be between the first data line and the pixel electrode, the transistor comprising a gate electrode connected to a gate line; and a capacitor connected to be between the pixel electrode and a common electrode.

3. The liquid crystal display apparatus of claim 1, wherein the first voltage line delivers a gate off voltage.

4. A liquid crystal display apparatus comprising:

a first pixel connected to a first gate line, a first data line and a first storage voltage line;

a second pixel connected to the first gate line and a second data line comprising a storage capacitor, the storage capacitor having a first terminal and a second terminal, the first terminal being connected to a pixel electrode, and the second terminal being connected to the first storage voltage line;

a light sensing unit configured to detect an external light, the light sensing transistor being connected to be between a second storage voltage line and a first node and comprising a gate electrode connected a second gate line;

a first capacitor connected to be between the second gate line and the first node; and a transfer unit connected to be between the first node and a sensing line and comprising a gate electrode connected to the first gate line.

* * * * *